United States Patent
Murakami et al.

(10) Patent No.: US 9,985,446 B2
(45) Date of Patent: May 29, 2018

(54) VEHICLE ELECTRIC POWER SUPPLY CONTROL SYSTEM AND VEHICLE

(71) Applicant: SUZUKI MOTOR CORPORATION, Shizuoka (JP)

(72) Inventors: Takanori Murakami, Shizuoka (JP); Yoshifumi Takai, Shizuoka (JP); Yohei Takada, Shizuoka (JP); Yoshimasa Matsumoto, Shizuoka (JP); Kengo Ikeya, Shizuoka (JP); Damian Patrick Davies, Nottinghamshire (GB); Nathan Grange, Derbyshire (GB)

(73) Assignee: SUZUKI MOTOR CORPORATION, Shizuoka (JP)

( * ) Notice: Subject to any disclaimer, the term of this patent is extended or adjusted under 35 U.S.C. 154(b) by 414 days.

(21) Appl. No.: 14/395,896

(22) PCT Filed: Jan. 30, 2013

(86) PCT No.: PCT/JP2013/052092
§ 371 (c)(1),
(2) Date: Oct. 21, 2014

(87) PCT Pub. No.: WO2013/161340
PCT Pub. Date: Oct. 31, 2013

(65) Prior Publication Data
US 2015/0042156 A1 Feb. 12, 2015

(30) Foreign Application Priority Data

Apr. 24, 2012 (JP) .................................. 2012-098499

(51) Int. Cl.
*H02J 7/00* (2006.01)
*H01M 10/44* (2006.01)
(Continued)

(52) U.S. Cl.
CPC ............ *H02J 7/0029* (2013.01); *B60L 1/003* (2013.01); *B60L 3/0046* (2013.01);
(Continued)

(58) Field of Classification Search
CPC .. B60L 1/003; B60L 11/1803; B60L 11/1861; B60L 11/1885; B60L 11/1887;
(Continued)

(56) References Cited

U.S. PATENT DOCUMENTS

2006/0238033 A1* 10/2006 Raiser .................. H01M 10/44
307/66
2006/0272868 A1* 12/2006 Fuse .................. B60L 11/1885
180/65.1
2010/0068577 A1* 3/2010 Umayahara ....... H01M 8/04238
429/432

FOREIGN PATENT DOCUMENTS

JP 2001-95108 A 4/2001
JP 2005-151643 A 6/2005
(Continued)

OTHER PUBLICATIONS

Translation of JP2009199764.*
(Continued)

*Primary Examiner* — Rexford Barnie
*Assistant Examiner* — Elim Ortiz
(74) *Attorney, Agent, or Firm* — Rothwell, Figg, Ersnt & Manbeck, P.C.

(57) ABSTRACT

To restrain deterioration of fuel cells while preventing a battery from being overcharged, a fuel cell vehicle includes a motor for providing torque to wheels, a battery for storing electric power to provide the stored electric power to the motor, and a FC stack for generating electric power to provide the generated electric power to the motor and the battery. A battery charge level determining module deter-
(Continued)

mines a battery charge level of the battery, and a FET is configured to connect or disconnect the FC stack to the motor and the battery. A controller is configured to cause the FET to disconnect the FC stack from the motor and the battery and allow power generation by the FC stack when the determined battery charge level by the battery charge level determining module is greater than or equal to a first predetermined threshold.

5 Claims, 5 Drawing Sheets (51) Int. Cl.
| | |
|---|---|
| H01M 10/46 | (2006.01) |
| H01M 10/48 | (2006.01) |
| H01M 16/00 | (2006.01) |
| B60L 3/00 | (2006.01) |
| B60L 11/18 | (2006.01) |
| B60R 16/033 | (2006.01) |
| B60L 1/00 | (2006.01) |
| H02J 9/06 | (2006.01) |
| H02J 1/00 | (2006.01) |

(52) U.S. Cl.
CPC ......... *B60L 3/0053* (2013.01); *B60L 11/1803* (2013.01); *B60L 11/1861* (2013.01); *B60L 11/1885* (2013.01); *B60L 11/1887* (2013.01); *B60L 11/1898* (2013.01); *B60R 16/033* (2013.01); *H01M 10/44* (2013.01); *H01M 10/46* (2013.01); *H01M 10/48* (2013.01); *H01M 16/006* (2013.01); *H02J 7/0068* (2013.01); *H02J 9/062* (2013.01); *B60L 2210/10* (2013.01); *B60L 2240/80* (2013.01); *H01M 2220/20* (2013.01); *H01M 2250/20* (2013.01); *H02J 2001/004* (2013.01); *H02J 2007/0037* (2013.01); *Y02B 90/14* (2013.01); *Y02T 10/705* (2013.01); *Y02T 10/7044* (2013.01); *Y02T 10/7216* (2013.01); *Y02T 90/32* (2013.01); *Y02T 90/34* (2013.01)

(58) Field of Classification Search
CPC .. B60L 11/1898; B60L 3/0046; B60L 3/0053; B60R 16/033; H01M 10/44; H01M 10/46; H01M 10/48; H01M 16/006; H02J 7/0029; H02J 7/0068; H02J 9/062
USPC .......................................... 307/9.1
See application file for complete search history.

(56) References Cited

FOREIGN PATENT DOCUMENTS

| JP | 2006-304575 A | | 11/2006 |
|---|---|---|---|
| JP | 2008-538650 A | | 10/2008 |
| JP | 2009-199764 A | | 9/2009 |
| JP | 2009199764 A | * | 9/2009 |
| WO | 2008/004564 A1 | | 1/2008 |
| WO | 2011/049975 A1 | | 4/2011 |

OTHER PUBLICATIONS

Patents Act 1977: Patents Rules 2007 Notification of Grant dated Sep. 27, 2016 in corresponding GB Patent Application No. GB1417592.1 (2 pages).
International Search Report dated Apr. 16, 2013 in PCT/JP2013/052092.
Examination Report under Section 18(3) dated Mar. 23, 2016 in corresponding GB Patent Application No. GB1417592.1 (2 pages).
Notice of Allowance dated Sep. 8, 2015 in corresponding Japanese Patent Application No. 2014-512382 (1 page).
Office Action dated Sep. 18, 2015 in corresponding German Patent Application No. 11 2013 002 180.3 (with an English translation) (6 pages).
Examination Report under Section 18(3) dated Jun. 2, 2016 in corresponding GB Patent Application No. 1417592.1 (3 pages).

* cited by examiner

VEHICLE ELECTRIC POWER SUPPLY CONTROL SYSTEM AND VEHICLE

CROSS REFERENCE TO RELATED APPLICATION

This application is a 35 U.S.C. 371 National Phase Entry Application from PCT/JP2013/052092, filed Jan. 30, 2013, which claims priority Japanese Patent Application No. 2012-098499, filed Apr. 24, 2012, the disclosures of which are incorporated herein in their entirety by reference.

TECHNICAL FIELD

The present invention relates to technology for charging a battery using electric power provided by fuel cells and powering a motor.

BACKGROUND ART

Vehicles, which have a hybrid system incorporating a battery (i.e. a secondary battery) to improve system efficiency or to compensate for instantaneous load requirement at acceleration, are currently known as conventional fuel cell electric vehicles.

Moreover, in order to adjust the voltage between the fuel cells (or FC) and the battery, most fuel cell vehicles of the above kind have a DC//DC converter at a branch for the fuel cells or the battery.

However, since DC/DC converters are in general large and heavy parts, it is desirable to eliminate a DC/DC converter and to electrically and directly connect fuel cells to a battery and furthermore a motor (or an inverter).

Thus, there is disclosed in JP 2005-151643A a configuration that, without voltage conversion between fuel cells and a battery by a DC/DC converter, the fuel cells and the battery are directly connected in parallel via a relay box. Moreover, there is also disclosed in JP 2008-538650A a configuration that does not require a DC/DC converter between fuel cells and a battery.

PRIOR ART

Patent Literatures

Patent literature 1: JP 2005-151643A
Patent literature 2: JP 2008-538650A

SUMMARY OF INVENTION

Problem To Be Solved by Invention

Incidentally, in most systems in which fuel cells and a battery are directly connected, the battery is charged with power generated by the fuel cells when there is no load requirement for providing power to a motor or the load requirement is low. In addition, if such charging state continues, the battery will fall in its overcharged state.

However, in JP 2005-151643A, there is no disclosure regarding measures to be taken to prevent a battery from falling into overcharged state.

Even though JP 2008-538650A discloses such measures, there are, as simple measures, measures of stopping power generation by fuel cells or disconnecting the fuel cells from a battery when the output voltage from the fuel cells is higher than an upper limit permissible voltage (i.e., a voltage level defining an upper limit of battery voltage levels with which the battery is free from its overcharged state).

However, when the voltage of fuel cells become a circuit open voltage level during start-up and shut-down processes, the deterioration of catalyst on electrodes of the fuel cells is accelerated.

An object of the present invention is to restrain deterioration of fuel cells while preventing a battery from being overcharged.

Means To Solve Problem

In order to accomplish the object, (1) there is provided, according to one aspect of the present invention, a vehicle electric power supply control system, in a vehicle that includes a motor for providing torque to wheel, a battery for storing electric power to provide the stored electric power to the motor, and fuel cells for generating electric power to provide the generated electric power to the motor and the battery, for controlling supply of electric power from the fuel cells, characterized by comprising: a battery charge level determining module for determining a battery charge level of the battery; a switch unit configured to provide connection of the fuel cells to the motor and the battery or disconnect the connection; and a controller configured to cause the switch unit to disconnect the connection of the fuel cells to the motor and the battery and to allow power generation by the fuel cells when the determined battery charge level by the battery charge level determining module is greater than or equal to a first predetermined threshold.

(2) It is desirable, according to one aspect of the present invention, that the controller stops power generation by the fuel cells upon elapse of a predetermined duration since the switch unit disconnected the connection of the fuel cells to the motor and the battery.

(3) It is desirable, according to one aspect of the present invention, that the controller stops power generation by the fuel cells when the determined battery charge level by the battery charge level determining module is greater than or equal to a second predetermined threshold that is less than the first predetermined threshold upon elapse of a predetermined duration since the switch unit disconnected the connection of the fuel cells to the motor and the battery, but it causes the switch unit to connect the fuel cells to the motor and the battery again when the determined battery charge level by the battery charge level determining module is less than the second predetermined threshold upon elapse of the predetermined duration since the switch unit disconnected the connection of the fuel cells to the motor and the battery.

(4) It is desirable, according to one aspect of the present invention, that the switch unit is a field effect transistor.

(5) There is provided, according to one aspect of the present invention, a vehicle including a motor for providing torque to wheel, a battery for storing electric power to provide the stored electric power to the motor, and fuel cells for generating electric power to provide the generated electric power to the motor and the battery, characterized by comprising: a battery charge level determining module for determining a battery charge level of the battery; a switch unit configured to provide connection of the fuel cells to the motor and the battery or disconnect the connection; and a controller configured to cause the switch unit to disconnect the connection of the fuel cells to the motor and the battery and to allow power generation by the fuel cells when the determined battery charge level by the battery charge level determining module is greater than or equal to a first predetermined threshold.

Effect of Invention

According to the aspects (1) and (5) of the present invention, even in the case of configuration that fuel cells and the battery are connected without any DC/DC converter, the vehicle or the vehicle electric power supply control system is enabled to prevent overcharged state of the battery by disconnecting the fuel cell stack from the motor and the battery when the battery charge level is greater than or equal to the predetermined threshold. Moreover, according to the aspect (1) of the present invention, the vehicle or the vehicle electric power supply control system is enabled to lower the frequency of start-up and shut-down of the fuel cells thereby to restrain the deterioration of the fuel cells by allowing the fuel cells to continue power generation when the battery charge level is greater than or equal to the predetermined threshold.

According to the aspect (2) of the present invention, the vehicle electric power supply control system is enabled to restrain the deterioration of the fuel cells caused due to the event that the fuel cells continue to generate electric power.

According to the aspect (3) of the present invention, the deterioration is restrained because the fuel cells do not enter start-up and shut-down processes by continuing to generate electric power when the battery charge level is less than a second predetermined threshold upon elapse of a predetermined duration since the fuel cells were disconnected from the motor and the battery.

According to the aspect (4) of the present invention, the vehicle electric power supply control system is enabled to prevent appearance of overcurrent caused due to a difference between terminal voltages of the switch unit when the fuel cells are connected to the motor and the battery.

DESCRIPTION OF EMBODIMENT(S)

Referring to the drawings, description will be made of an embodiment according to the present invention.

In the present embodiment, a fuel cell vehicle with a vehicle electric power supply control is given.

Figure 1:
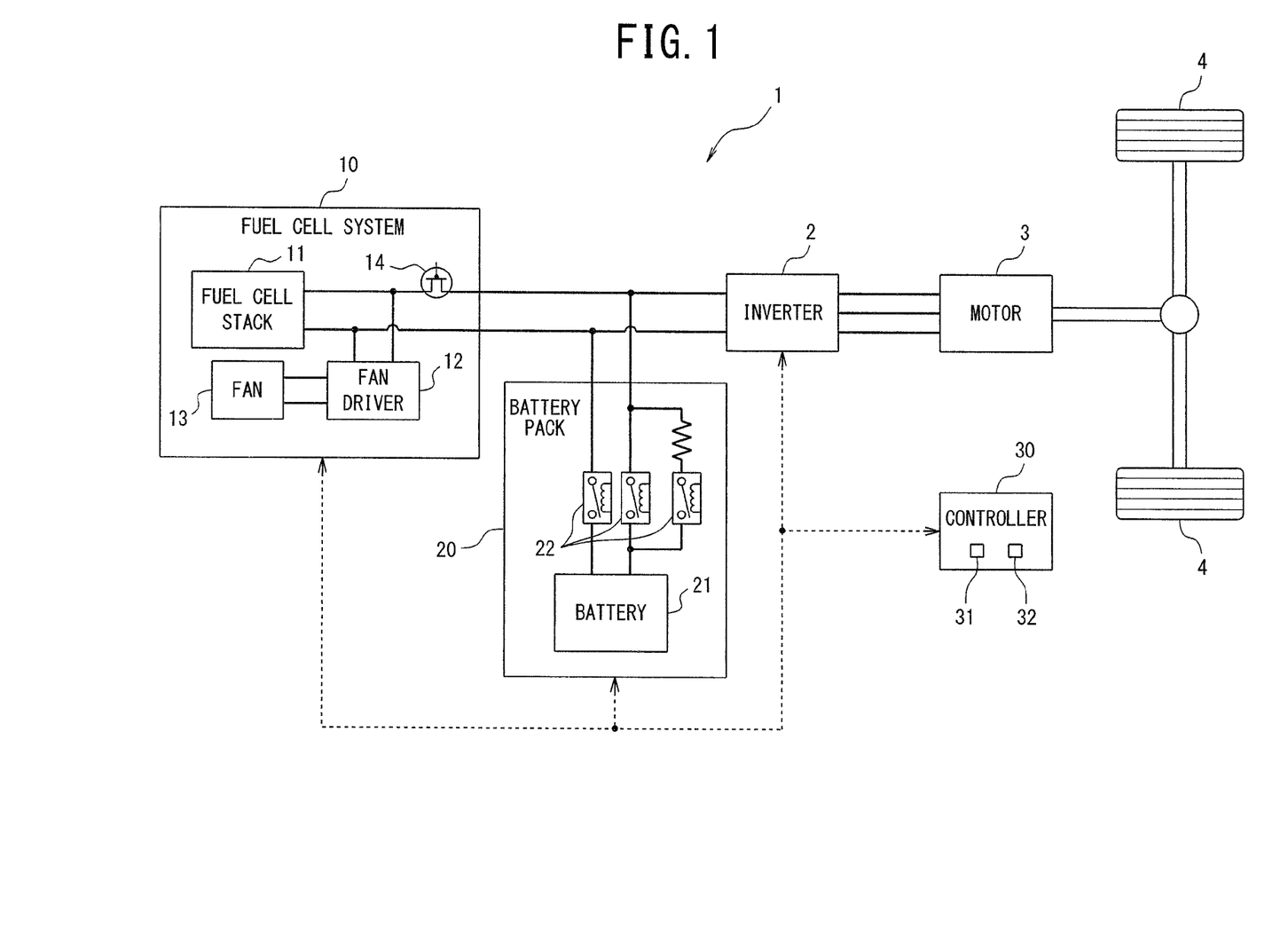
FIG. 1 is a schematic diagram depicting an exemplary configuration of the present embodiment of a fuel cell vehicle.

FIG. 1 is a figure depicting an exemplary configuration of a fuel cell vehicle 1.

As shown in FIG. 1, fuel cell vehicle 1 has a fuel cell or FC system 10, a battery pack 20, an inverter 2, a motor 3 and a controller 30.

FC system 10 supplies electric power to battery pack 20 and inverter 2. This FC system 10 has a fuel cell stack, called a FC stack below, 11, a fan driver 12, a fan 13 and a field effect transistor or FET 14.

In FC system 10, fan driver 12 and FET 14 are electrically connected to an output stage of FC stack 11. Fan driver 12 and FET 14 are electrically connected to the output stage of FC stack 11 in this order.

Fan 13 is provided for causing FC stack 11 to generate electric power (by taking in air for power generation) and for cooling the system. Fan driver 12 drives this fan 13 by power supply from FC stack 11.

FET 14 is a switch unit enabling connection of inverter 2 (thus, including motor 3) and battery pack 20 to FC system 10 or disconnection of the connection.

Inverter 2 and battery pack 20 are electrically coupled to the output stage of FC system 10. Specifically, inverter 2 and battery pack 20 are parallel with respect to a power supply circuit for FC system 10. For example, this causes FET 14 to be located between fan driver 12 and battery pack 20 and between fan driver 12 and inverter 2 because, as previously mentioned, fan driver 12 and FET 14 are coupled in this order to the output stage of FC stack 11 within FC system 10.

Battery pack 20 has a plurality of relays 22 enabling connection of battery 21 to a circuit to which FC system 10 may supply electric power and disconnection of the connection.

Inverter 2, under control of controller 30, causes motor 3 to provide torque to driving wheels 4 using power supply from FC system 10 or battery pack 20. Torque provided by this motor 3 propels the vehicle.

Controller 30 is configured in an ECU (Electronic Control Unit) including, for example a microcomputer and its peripheral circuits. Thus, controller 30 comprises CPU, ROM and RAM. ROM stores one or more than one programs for implementation of various kinds of processing. CPU executes such various kinds of processing in accordance with the stored one or two or more programs.

With reference to FIG. 1, controller 30 has a battery charge level determining module 31 and a timer 32. Battery charge level determining module 31 determines a battery charge level or SOC (State Of Charge) in specific, of battery 21 in battery pack 20. Timer 32 is used to measure a duration for which execution of operation in a later described idling mode continues.

Moreover, this controller 30 controls FC system 10, battery pack 20 and inverter 2. Specifically, based on battery SOC determined by battery charge level determining module 31, controller 30 causes the system to work differently depending on various modes, such as, an initial mode, a fuel cell shutdown mode, a normal mode and an idling mode. Description of the various modes is as follows.

Initial mode is a mode in which the system enters immediately after start-up of FC system 10. Fuel cell shutdown mode is a mode in which FC stack 11 is prevented from generating power. Normal mode is a mode in which FC stack 11 is caused to generate power (or FC stack 11 is in operation state). Idling mode is a mode in which FC stack 11 is caused to generate power in a state where FC system 10 is disconnected from battery pack 20 and inverter 2.

Figure 2:
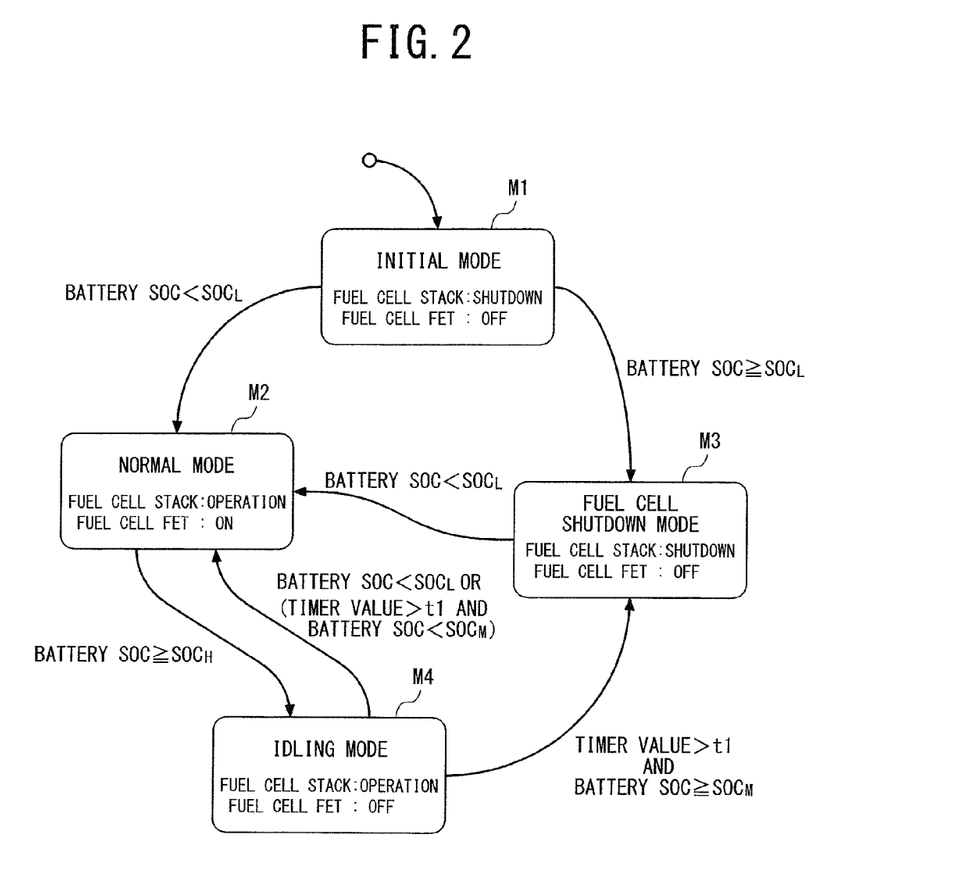
FIG. 2 is a state diagram used to describe one example of the state transition among modes in which a controller may operate.

FIG. 2 is a diagram (or a state diagram) used to describe one example of the state transition among such modes. With reference to this state diagram, how the system works in each mode is described in more details in the following paragraphs while describing the transition to each mode.

As shown in FIG. 2, in initial mode M1, FC stack 11 is shut down and FET (or fuel cell FET") 14 is turned off. In normal mode M2, FC stack 11 is in operation state and FET 14 is turned on. In fuel cell shutdown mode M3, FC stack 11 is shut down and FET 14 is turned off. In idling mode M4, FC stack 11 is in operation state and FET 14 is turned off.

First of all, controller 30, which is capable of controlling the system in each of such modes, initiates start-up of FC system 10 to work in initial mode M1. In this initial mode, controller 30 continues to determine battery state of charge, which is represented by a detection value determined by battery charge level determining module 31, and causes the system to enter fuel cell shutdown mode M3 if battery SOC becomes greater than or equal to a threshold $SOL_L$ (battery $SOL \geq SOL_L$) for low level determination. It is just then that controller 30 causes the system to perform transition from initial mode M1 to fuel cell shutdown mode M3 by holding FC stack 11 in shutdown state and FET 14 in off state.

Moreover, if battery SOC becomes lower than a threshold $SOC_L$ for low level determination (battery $SOC<SOC_L$) during operation in the initial mode, controller 30 causes the system to enter normal mode M2. It is just then that controller 30 causes the system to perform transition from initial mode M1 to normal mode M2 by starting up FC stack 11 and turning FET 14 on to connect FC stack 11 to battery pack 20 and inverter 2.

It is to be noted here that threshold $SOC_L$ for low level determination is a predetermined value that may be determined beforehand experimentally or empirically or theoretically.

After transition to normal mode M2, if battery SOC becomes greater than or equal to a threshold $SOC_H$ for high level determination (battery $SOC \geq SOC_H$) during this normal mode, controller 30 causes the system to enter idling mode M4. It is just then that controller 30 causes the system to perform transition from normal mode M2 to idling mode M4 by holding FC stack 11 in operation state and turning FET 14 off to disconnect FC stack 11 from battery pack 20 and inverter 2.

Here, it is to be noted that threshold $SOC_H$ for high level determination is a threshold for determining whether or not battery 21 is overcharged. This threshold $SOC_H$ for high level determination is greater than threshold $SOC_L$ for low level determination ($SOC_H > SOC_L$). For example, threshold $SOC_H$ for high level determination is a predetermined value that may be determined beforehand experimentally or empirically or theoretically.

Moreover, after transition to fuel cell shutdown mode M3, if battery SOC becomes less than threshold $SOC_L$ for low level determination (battery $SOC<SOC_L$) during this fuel cell shutdown mode, controller 30 causes the system to enter normal mode M2. It is just then that controller 30 causes the system to perform transition from fuel cell shutdown mode M3 to normal mode M2 by starting up FC stack 11 and turning FET 14 on to connect FC stack 11 to battery pack 20 and inverter 2.

Moreover, after transition to the idling mode M4, controller 30 starts up timer 32 upon this transition (i.e., the beginning of this idling mode M4). Since FC stack 11 generates power in this idling mode M4, controller 30 causes fan driver 12 to activate fan 13 which is provided for causing FC stack 11 to generate power (by taking in air for power generation) and for cooling the system. Then, fan 13 operates on power supply from FC stack 11.

If, during this idling mode, battery SOC becomes less than threshold $SOC_L$ for low level determination (battery $SOC<SOC_L$) or the timer value become greater than threshold t1 for elapsed time determination and battery SOC becomes less than a threshold $SOC_M$ for middle level determination (timer value>t1 & battery $SOC<SOC_M$), controller 30 causes the system to enter normal mode M2. It is just then that controller 30 causes the system to perform transition from idling mode M4 to normal mode M2 by holding FC stack 11 in operation state and turning FET 14 on to connect FC stack 11 to battery pack 20 and inverter 2.

Moreover, if the timer value becomes greater than threshold t1 for elapsed time determination and battery SOC is greater than or equal to threshold $SOC_M$ for middle level determination (timer value>t1 & battery $SOC \geq SOC_M$), controller 30 causes the system to enter fuel cell shutdown mode M3. It is just then that controller 30 causes the system to perform transition from idling mode M4 to fuel cell shutdown mode M3 by shutting down FC stack 11 while holding FET 14 in off state.

It is to be noted here that threshold $SOC_M$ for middle level determination is less than threshold $SOC_H$ for high level determination but greater than threshold $SOC_L$ for low level determination ($SOC_H > SOC_M > SOC_L$). For example, threshold $SOC_L$ for middle level determination is a predetermined value that may be determined beforehand experimentally or empirically or theoretically.

Threshold t1 for elapsed time determination represents a duration, such that the degree of deterioration of the FC stack 11, which is derived from operation of FC stack 11 during the duration represented by threshold t1 for elapsed time determination, is equal to or lower than the degree of deterioration of FC stack 11, which is derived from a cycle of shut-down of FC stack 11 and its subsequent start-up.

Figure 3:
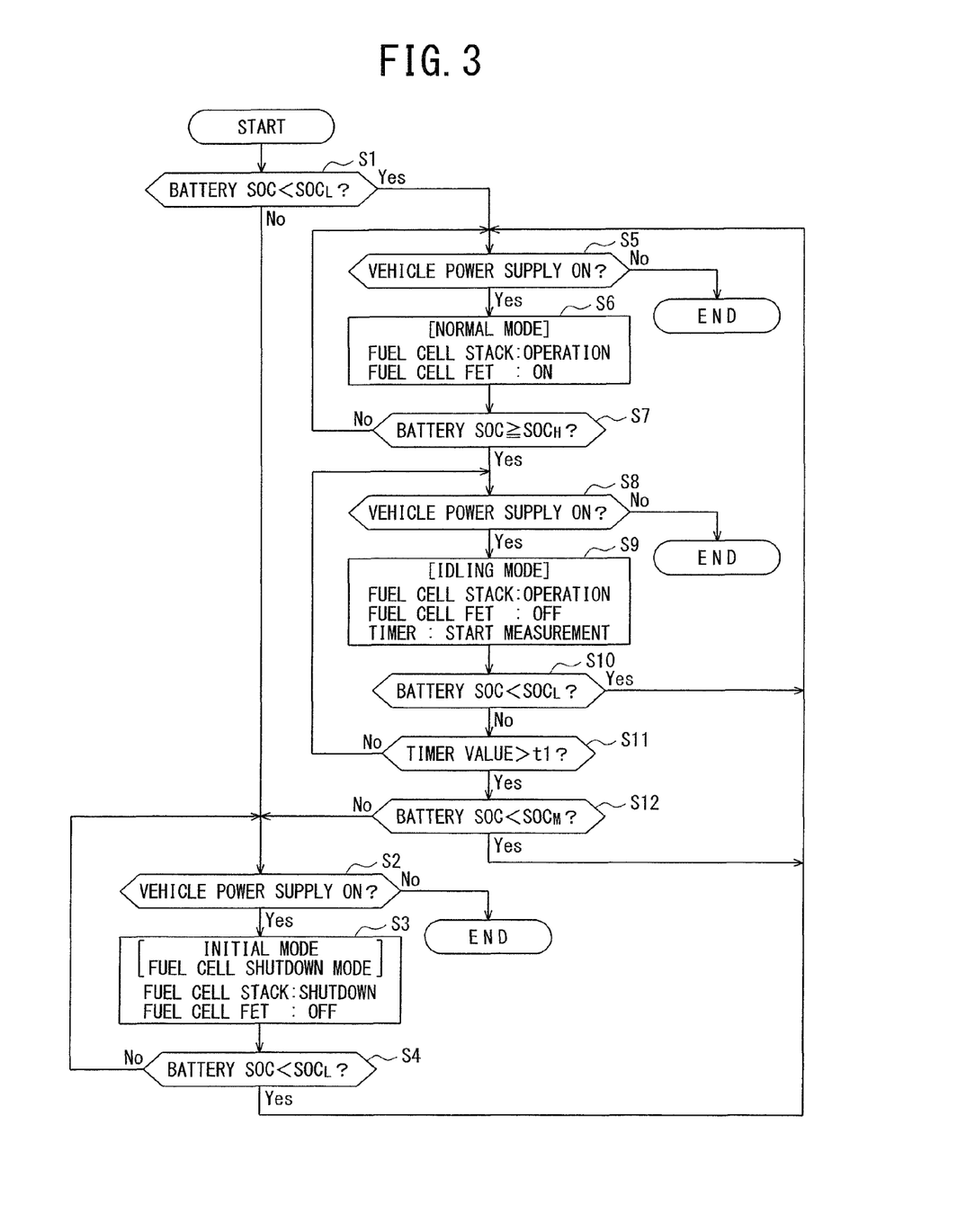
FIG. 3 is a flowchart illustrating one example of algorithm followed by the controller.

FIG. 3 is a schematic of a flowchart illustrating one example of implementing transitions among modes as previously described.

As shown in FIG. 3, first at step S1, controller 30 determines whether battery SOC is less than threshold $SOC_L$ for low level determination. If it determines that battery SOC is less than threshold $SOC_L$ for low level determination ($SOC<SOC_L$), controller 30 causes algorithm to proceed to step S5. In addition, if it determines that battery SOC is greater than or equal to threshold $SOC_L$ for low level determination ($SOC \geq SOC_L$), controller 30 causes the algorithm to proceed to step S2.

At step S2, controller 30 determines whether vehicle power supply is turned on. If it determines that vehicle power supply is turned on, controller 30 causes the algorithm to proceed to step S3. In addition, if it determines that vehicle power supply is not turned on, controller 30 causes the algorithm illustrated in FIG. 3 to exit.

At step S3, controller 30 causes FC stack 11 to be shut down and causes FET 14 to be turned off. At the next step S4, controller 30 determines whether battery SOC is less than threshold $SOC_L$ for low level determination. If it determines that battery SOC is less than threshold $SOC_L$ for low level determination (battery $SOC<SOC_L$), controller 30 causes the algorithm to proceed to step S5. In addition, if it determines that battery SOC is greater than or equal to threshold $SOC_L$ for low level determination (battery $SOC \geq SOC_L$), controller 30 causes the algorithm to start with step S2 again.

The algorithm at steps S3 and S4 corresponds to processing in initial mode M1 and fuel cell shutdown mode M3.

At step S5, controller 30 determines whether the vehicle power supply is turned on. If it determines that the vehicle power supply is turned on, controller 30 causes the algorithm to proceed to step S6. In addition, if it determines that the vehicle power supply is not turned on, controller 30 causes the algorithm illustrated in FIG. 3 to exit.

At step S6, controller 30 causes FC stack 11 to assume operation state and causes FET 14 to be turned on. At the next step S7, controller 30 determines whether battery SOC is greater than or equal to threshold $SOC_H$ for high level determination. If it determines that battery SOC is greater than or equal to threshold $SOC_H$ for high level determination (battery $SOC \geq SOC_H$), controller 30 causes the algorithm to proceed to step S8. In addition, if it determines that battery SOC is less than threshold $SOC_H$ for high level determination (battery $SOC < SOC_H$), controller 30 causes the algorithm to start with step S5 again.

The algorithm at steps S6 and S7 corresponds to processing in normal mode M2.

At step S8, controller 30 determines whether the vehicle power supply is turned on. If it determines that the vehicle power supply is turned on, controller 30 causes the algorithm to proceed to step S9. In addition, if it determines that the vehicle power supply is not turned on, controller 30 causes the algorithm illustrated in FIG. 3 to exit.

At step S9, controller 30 causes FC stack 11 to assume operation state and causes FET 14 to be turned off. Additionally, controller 30 causes timer 32 to start measurement. At the next step S10, controller 30 determines whether battery SOC is less than threshold $SOC_L$ for low level determination. If it determines that battery SOC is less than threshold $SOC_L$ for low level determination (battery $SOC < SOC_L$), controller 30 causes the algorithm to proceed to the step S5. In addition, if it determines that battery SOC is greater than or equal to threshold $SOC_L$ for low level determination (battery $SOC \geq SOC_L$), controller 30 causes the algorithm to proceed to step S11.

At step S11, controller 30 determines whether the timer value started to be measured at step S9 is greater than threshold t1 for elapsed time determination. If it determines that the timer value is greater than threshold t1 for elapsed time determination (timer value>t1), controller 30 causes the algorithm to proceed to step S12. In addition, if it determines that the timer value is less than or equal to threshold t1 for elapsed time determination (timer value t1), controller 30 causes the algorithm to start with the step S8 again.

At step S12, controller 30 determines whether battery SOC is less than threshold $SOC_M$ for middle level determination. If it determines that battery SOC is less than threshold $SOC_M$ for middle level determination (battery $SOC < SOC_M$), controller 30 causes the algorithm to proceed to step S5. In addition, if it determines that battery SOC is greater than or equal to threshold $SOC_M$ for middle level determination (battery $SOC \geq SOC_M$), controller 30 causes the algorithm to proceed to the step S2.

The algorithm at steps S9 to S12 corresponds to processing in idling mode M4.

Operation and Action

Next, a description is made of operation and action of vehicle.

When, in initial mode, battery SOC remains less than threshold $SOC_L$ for low level determination (battery $SOC < SOC_L$), controller 30 causes the system to perform transition to normal mode M2 by starting up FC stack 11 and turning on FET 14 to electrically connect FC stack 11 to battery pack 20 and inverter 2.

In normal mode M2, controller 30 allows supply power from FC stack 11 to charge battery pack 20 and to drive motor 3 as needed.

Moreover, when, in this normal mode, battery SOC becomes equal to or greater then threshold $SOC_H$ for high level determination ($SOC \geq SOC_H$), controller 30 causes the system to perform transition to idling mode M4 by causing FC stack 11 to remain in operation state and turning off FET 14 to electrically disconnect FC stack 11 from battery pack 20 and inverter 2.

In idling mode M4, since supply of power to battery pack 20 and motor 3 (particularly inverter 2) from FC stack 11 is discontinued, inverter 2 operates motor 3 on supply of power from battery pack 20.

When, during this idling mode, battery SOC becomes less than threshold $SOC_L$ for low level determination (battery $SOC < SOC_L$) because of power consumption by motor drive or battery SOC becomes less than threshold $SOC_M$ for middle level determination upon timer value, which is counting since the beginning of idling mode, becoming greater than threshold t1 for elapsed time determination (timer value>t1 and battery $SOC < SOC_M$), controller 30 causes the system to perform transition to normal mode M2 by turning on FET 14 to electrically connect FC stack 11 to battery pack 20 and inverter 2 with FC stack 11 remaining in operation state.

Moreover, when during this idling mode, battery SOC stays greater than or equal to threshold $SOC_M$ for middle level determination even though power is consumed by motor drive upon timer value, which is counting since the beginning of idling mode, becoming greater than threshold t1 for elapsed time determination, controller 30 causes the system to perform transition to fuel cell shutdown mode M3 by shutting down FC stack 11 with FET 14 remaining in off state.

In this fuel cell shutdown mode M3, since, like idling mode M4, supply of power to battery pack 20 and motor 3 (particularly inverter 2) from FC stack 11 is discontinued, inverter 2 operates motor 3 on supply of power from battery pack 20.

Moreover, since, in this fuel cell shutdown mode M3, FC stack 11 is caused to stop working and FC stack 11 is disconnected from battery pack 20 and inverter 2 to become unloaded, the voltage of FC stack 11 becomes as high as an open circuit voltage with the highest potential. It will be discussed later that the voltage of FC stack 11 becomes as high as an open circuit voltage with the highest potential.

When, during this fuel cell shutdown mode, battery SOC becomes less than threshold $SOC_L$ for low level determination (battery $SOC < SOC_L$) because of power consumption by motor drive, controller 30 causes the system to perform transition to normal mode M2 by starting up FC stack 11 and turning on FET 14 to electrically connect FC stack 11 to battery pack 20 and inverter 2.

Effects of Present Embodiment

According to the present embodiment, in fuel cell vehicle 1, even though FC stack 11 and battery pack 20 are connected to each other without DC/DC converter, when battery SOC is greater than or equal to threshold $SOC_H$ for high level determination, connection of FC stack 11 to battery pack 20 and motor 3, specifically inverter 2, is disconnected in idling mode M4. This prevents battery 21 from being over charged in fuel cell vehicle 1 according to the present embodiment.

Moreover, the present embodiment uses FET 14 as a switch unit configured to provide connection of FC stack 11 to battery pack 20 and motor 3 (particularly inverter 2) and disconnect the connection. This prevents appearance of overcurrent caused due to a difference between terminal voltages of FET 14 because, in fuel cell vehicle 1 according to the present embodiment, FET 14 restricts electric current during electrically connecting FC stack 11 to battery pack 20 and motor 3, particularly inverter 2 by switching action of FET 14.

Moreover, in fuel cell vehicle 1 according to the present embodiment, even though battery SOC is greater than or equal to threshold $SOC_H$ for high level determination, FC stack 11 continues to generate power by selecting idling mode M4. This reduces the frequency of start-up/shut-down of FC stack 11 in fuel cell vehicle 1 according to the present embodiment, thereby restraining deterioration of FC stack 11.

Now, it is additionally described with reference to FIGS. 4 and 5 why a reduction in the frequency that a start-up/shut-down of FC stack 11 occurs brings about deterioration of FC stack 11.

Figure 4:
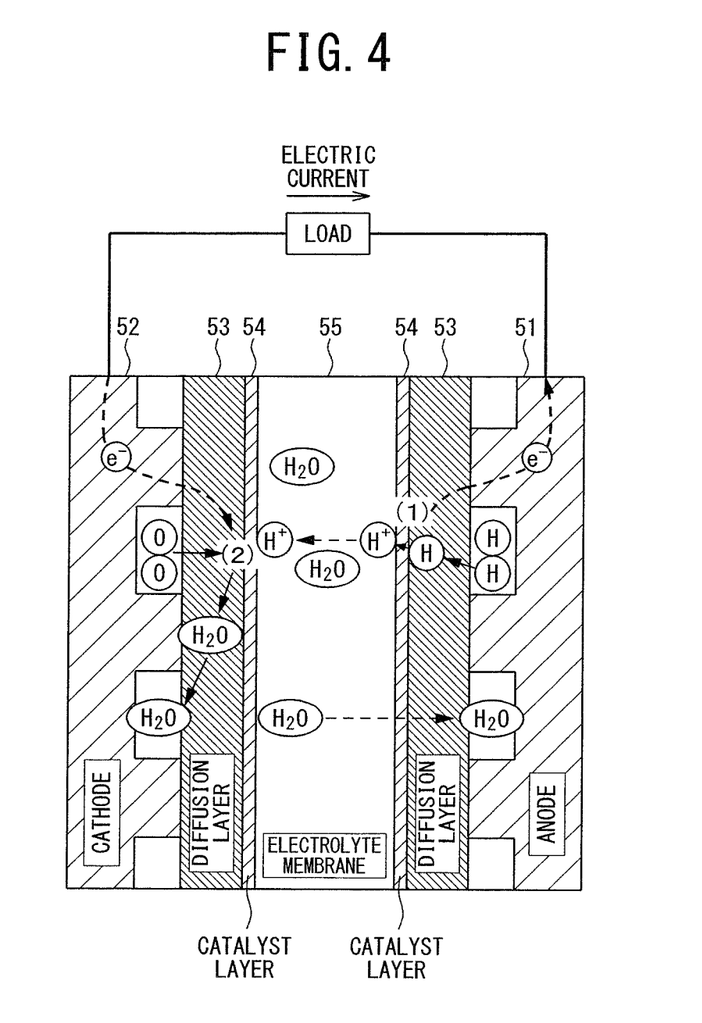
FIG. 4 is a schematic view illustrating an example of the structure of a hydrogen fuel cell.

FIG. 4 is a schematic view illustrating an example of the structure of a hydrogen fuel cell. FIG. 5 is a view illustrating relationship between voltage and power of a typical fuel cell.

First, a description is made of electrochemical reaction taking place in a fuel cell system and production of water associated therewith.

A fuel cell system is configured to be a stack by laminating a large number of minimum units usually called cells. As shown in FIG. 4, in each cell of a typical proton exchange membrane fuel cell system, an anode 51 and a cathode 52, to which air (or oxygen) and hydrogen are fed, have interposed between them diffusion layers 53, anode and cathode catalyst layers 54 and an electrolyte membrane 55. Each catalyst layer 54 is a layer to increase the rate of reaction. In addition, electrolyte membrane 55 is a membrane designed to allow the hydrogen ions to pass through it but the electrons.

In such configuration, anode catalyst layer 54 on that side of anode 51 which faces the electrolyte causes the hydrogen fed to anode 51 to be activated to turn into hydrogen ions, freeing electrons. In FIG. 4, the reaction denoted by (1) is represented by the following chemical equation (1), $$H_2 \rightarrow 2H^+ + 2e^- \quad (1).$$

Hydrogen ions derived from the reaction represented by the above-mentioned equation (1) pass through electrolyte membrane 55 from the side of anode 51 to the side of cathode 52 together with moisture contained in electrolyte membrane 55. The freed electrons travel through an external circuit to cathode 52. Oxygen molecules of air fed to cathode 52 on the other side of the membrane combine with electrons from the external circuit at cathode catalyst layer 54 into oxygen ions and react with hydrogen ions passed through electrolyte membrane 55 to form water. In FIG. 4, the reaction denoted by (2) is represented by the following chemical equation (2), $$\tfrac{1}{2}O_2 + 2H^+ + 2e^- \rightarrow H_2O \quad (2).$$

A portion of moisture created in this manner travels from cathode 52 to anode 51 under concentration diffusion.

Fuel cell exhibits characteristics causing the terminal voltage to decrease as the generated electric current and power increases due to various losses, such as losses derived from a resistance overvoltage derived from resistances of electrolyte 55 and the terminals, an activation overvoltage for causing an electrochemical reaction between hydrogen and oxygen and a diffusion overvoltage for causing hydrogen and oxygen to pass through diffusion layers 53, respectively, appearing, due to the above-mentioned chemical reactions, inside the fuel cell.

Figure 5:
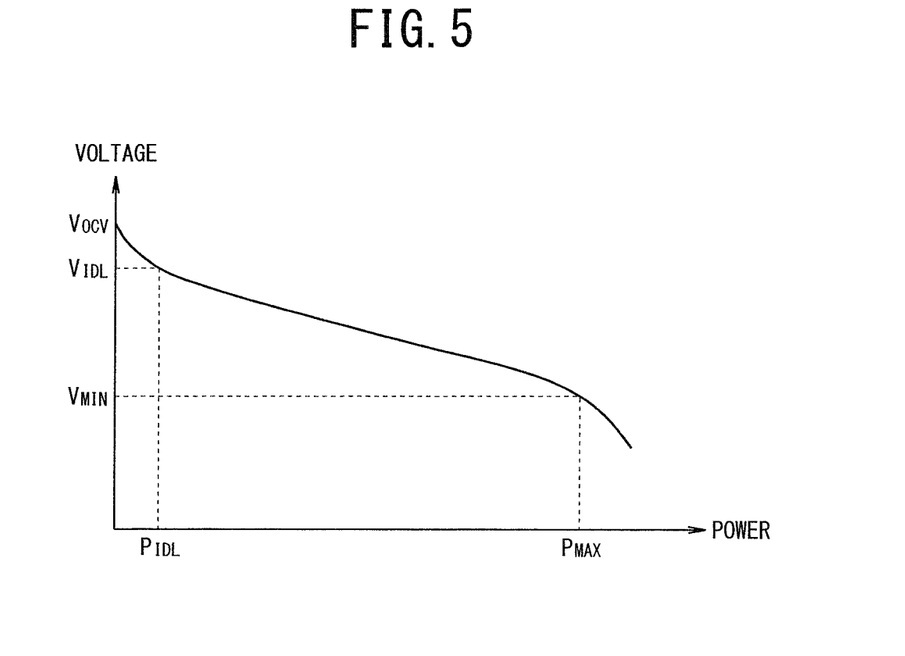
FIG. 5 is a view illustrating relationship between voltage and power of a typical fuel cell.

With reference to FIG. 5, describing fuel cell characteristics, during shut-down, load is disconnected from a fuel cell and potentials to which the fuel cell is exposed becomes an open circuit voltage $V_{OCV}$, i.e., the maximum voltage. After that, anode hydrogen pressure gradually drops through electrolyte membrane 55, accordingly bringing down a drop in potentials to which the fuel cell is exposed. Thus, it is a widely-known fact not to maintain potentials to which fuel cells are exposed at high potentials as much as possible in order to restrain deterioration of fuel cells.

As mentioned above, shutting down a fuel cell exposed to higher potentials considerably affects deterioration of the fuel cell. Thus, it is desired to make start/stop cycle (or frequency) low in order to restrain deterioration of fuel cell.

Thus, the present embodiment does not make a direct transition from normal mode M2 to fuel cell shutdown mode M3, but an indirect transition from normal mode M2 to fuel cell shutdown mode M3 after a transition to idling mode M4. This first activates fan 13 rather than instantaneously disconnecting load such as battery pack 20 from power supply line, exposes the power supply line to a voltage ($V_{IDL}$) for idling state that is lower than open circuit voltage ($V_{OCV}$), and reduces the number of shut-down events of FC stack 11 as possible, resulting in a reduction in the number of start-up events, thereby restraining deterioration of fuel cells.

Additionally, in the system configuration like the present embodiment, if motor 3 that is load is disconnected from FC stack 11 with FC system 10 remains in operation, power generated by FC stack 11 is consumed by fan 13 that is one of accessories by an amount $P_{IDL}$ in idling state. This results in reducing the level of the generated power by FC stack 11 to voltage of $V_{IDL}$ that is lower than open circuit voltage of $V_{OCV}$.

Despite the fact that, at idling, potential to which FC stack 11 is exposed is voltage of $V_{IDL}$ that is lower than open circuit voltage of $V_{OCV}$, but this potential condition is still high so that there remains an appreciable influence on deterioration of fuel cell. Thus, it cannot be said that staying in idling state for a long time is desirable.

As such, the present embodiment enters shut-down process to make FC stack 11 down to stop generating electric power during a transition from idling mode M4 to fuel cell shutdown mode M3, which takes place when battery SOC is greater than or equal to the threshold of $SOC_M$ for the criterion of middle level upon elapse of a duration equal to the threshold t1 for the criterion of elapsed time since FET 14 was turned off to disconnect FC stack 11 from battery pack 20 and motor 3 or inverter 2 in particular.

According to the present embodiment, this prevents deterioration of FC stack 11 caused by staying in idling mode M4 for a long time.

In the previous description of the present embodiment, FET 14 and controller 30 including battery charge level determining module 31 constitute, for example, a vehicle electric power supply control system.

Modified Embodiments

Instead of FET 14 in the present embodiment, a relay may be used.

In addition, instead of battery SOC as representing battery charge level of battery 21 in the present embodiment, battery voltage may be used.

While embodiments according to the present invention have been described in detail, it is not intended that these embodiments describe all possible forms encompassed by the present invention, and it is understood that all possible various embodiments for providing equivalent technical effects to those which the present invention aims at are encompassed by the present invention. Moreover, it is not intended that the combination of features as defined by claim 1 describes all possible forms encompassed by the present invention, and it is understood that all possible desired combinations of specific ones of all features described in the disclosure are encompassed by the present invention.

DESCRIPTION OF SYMBOLS

1 Fuel cell vehicle,
2 Inverter,
3 Motor,
10 Fuel cell system,
11 FC stack,
12 Fan driver,
13 Fan,
14 FET,
20 Battery pack,
21 Battery,
30 Controller,
31 Battery charge level determining module,
32 Timer

The invention claimed is:

1. A vehicle electric power supply control system, in a vehicle that includes a motor for providing torque to wheel, a battery for storing electric power to provide the stored electric power to the motor, and fuel cells for generating electric power to provide the generated electric power to the motor and the battery, for controlling supply of electric power from the fuel cells, comprising:
a battery charge level determining module for determining a battery charge level of the battery;
a switch unit configured to provide connection of the fuel cells to the motor and the battery or disconnect the connection;
an accessory connected to the fuel cells and driven by a power supply from the fuel cells; and
a controller configured (i) to cause the switch unit to disconnect the connection of the fuel cells to the motor and the battery, (ii) to cause the fuel cells to generate electric power, and (iii) to activate the accessory to cause the fuel cells to continue to generate electric power in a state where the fuel cells are disconnected from the motor and the battery when the determined battery charge level by the battery charge level determining module is greater than or equal to a first predetermined threshold.

2. The vehicle electric power supply control system according to claim 1, wherein the controller stops power generation by the fuel cells upon elapse of a predetermined duration since the switch unit disconnected the connection of the fuel cells to the motor and the battery.

3. The vehicle electric power supply control system according to claim 1, wherein the controller stops power generation by the fuel cells when the determined battery charge level by the battery charge level determining module is greater than or equal to a second predetermined threshold that is less than the first predetermined threshold upon elapse of a predetermined duration since the switch unit disconnected the connection of the fuel cells to the motor and the battery, wherein the controller is configured to cause the switch unit to reconnect the fuel cells to the motor and the battery when the determined battery charge level by the battery charge level determining module is less than the second predetermined threshold upon elapse of the predetermined duration since the switch unit disconnected the connection of the fuel cells to the motor and the battery.

4. The vehicle electric power supply control system according to claim 1, wherein the switch unit is a field effect transistor.

5. A vehicle including a motor for providing torque to wheel, a battery for storing electric power to provide the stored electric power to the motor, and fuel cells for generating electric power to provide the generated electric power to the motor and the battery, for controlling supply of electric power from the fuel cells, comprising:
a battery charge level determining module for determining a battery charge level of the battery;
a switch unit configured to provide connection of the fuel cells to the motor and the battery or disconnect the connection; and
an accessory connected to the fuel cells and driven by power supply from the fuel cells; and
a controller configured (i) to cause the switch unit to disconnect the connection of the fuel cells to the motor and the battery, (ii) to cause the fuel cells to generate electric power, and (iii) to activate the accessory to cause the fuel cells to continue to generate electric power in a state where the fuel cells are disconnected from the motor and the battery when the determined battery charge level by the battery charge level determining module is greater than or equal to a first predetermined threshold.

* * * * *